Patented Nov. 5, 1946

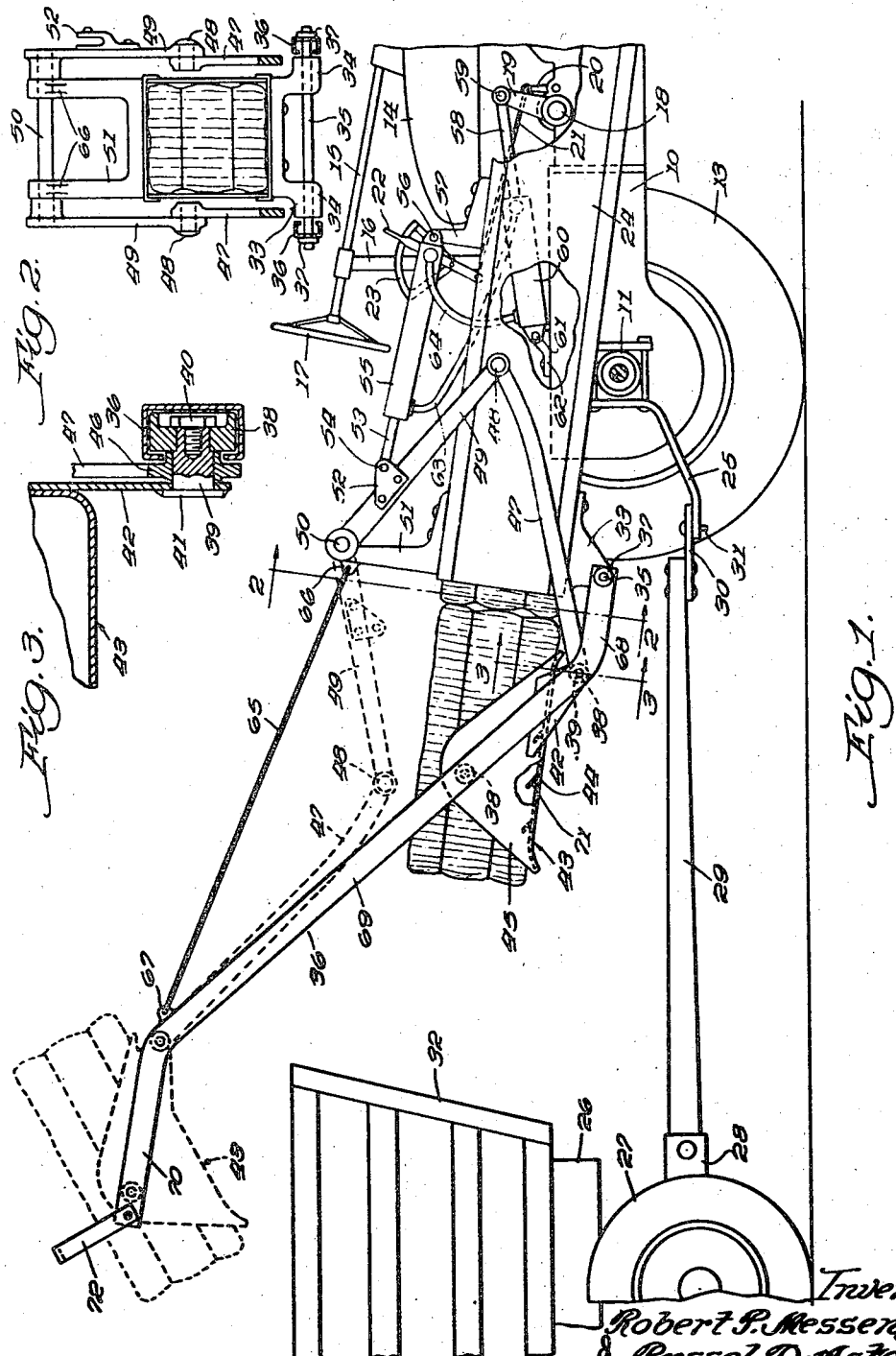

2,410,516

UNITED STATES PATENT OFFICE 2,410,516

BALE LOADING DEVICE

Robert P. Messenger, Kenilworth, and Russel D. Acton, Chicago, Ill., assignors to International Harvester Company, Chicago, Ill., a corporation of New Jersey Application September 24, 1945, Serial No. 618,304

9 Claims. (Cl. 214—100)

This invention relates to a bale loader. More specifically, it relates to a bale hoisting device for receiving bales from a pick-up baler and lifting them into a vehicle trailed behind the baler. Pick-up balers are in wide use at the present time, said balers traveling through the field being drawn by tractors or possibly being self-propelled and picking up the crops to be baled directly from the windrow. Usually, the bales are discharged from the baling chamber and drop to the ground, being subsequently picked up and loaded. As this requires a separate operation, attempts have been made to load the bales directly into a trailed vehicle. Unless another man is on the wagon to re-arrange the bales, it is difficult to load the bales on a wagon merely by pushing them up an incline onto the wagon.

The principal object of the present invention is to provide a bale-loading device for a pick-up baler which hoists the bales to a substantial height whereby they may be dropped into a large-capacity wagon having retaining sides and ends. With this type of device much less frequent re-arranging of the bales is required to fill the trailed wagon to capacity.

Another object is to provide a tractor-mounted baler with power-operated means actuated by the power-lift mechanism of the tractor to load bales in a trailed vehicle, said means being operable by the tractor operator.

Other more specific objects will be apparent from the detailed description to follow:

In the drawing,

Figure 1 is a side elevation showing the rear portion of a tractor-mounted baler and trailed vehicle connected to the tractor, and a bale-hoisting device arranged at the rear of the baler and cooperating with the trailed vehicle;

Figure 2 is a section on the line 2—2 of Figure 1;

Figure 3 is a section taken on the line 3—3 of Figure 1.

In the drawing, certain portions of a conventional agricultural tractor are shown. Said tractor has a narrow body 10, rear-axle housings 11, one of which can be seen in Figure 1, and drive axles, one of which is shown in section in Figure 1, the wheel at the near side being removed to better show the functional parts of the structure. One traction wheel 13 is shown at the far side of the tractor. A gasoline tank 14 and steering column 15, carried by a support 16 and a steering wheel 17, are also shown as parts of the tractor structure. As illustrated, the tractor is provided with a conventional power-lift mechanism including a transverse rockshaft 18 and an upwardly-extending lifting arm 19 mounted on the rockshaft. A control lever 20 for the power-lift mechanism is connected by a rod 21 with a manually controlled lever 22 which is pivoted on a quadrant 23 mounted on the steering column support 16. By manual operation of the control lever 22, the position of the rockshaft 20 may be controlled at the will of the operator.

In the construction illustrated the baler is carried directly on the tractor, a rearwardly-extending baling chamber 24 of a conventional design being illustrated as mounted directly on the axle housing 11 at one side of the tractor. A drawbar structure 25 is also rigidly secured to the axle housing structures 11 extending rearwardly behind the tractor.

A wagon including a frame structure 26, wheels 27, a draft structure 28, and a tongue 29 is secured in trailing position behind the tractor, the tongue being secured to the drawbar 25 of the tractor by a connecting member 30 and a clevis pin 31. A rack type body 32 having slatted sides of a substantial height is mounted on the wagon frame structure 26.

At the rear of the baling chamber 24 an attaching bracket structure 33 is rigidly secured to the bottom wall of the baling chamber. Said structure has two downwardly and outwardly extending brackets 34 through which a pivot shaft 35 extends. Said pivot shaft also extends through oppositely spaced channel members 36, retaining members 37 being provided at the ends of the shaft 35 to maintain the channel members 36 in position. Said channel members are C-shaped in cross section, as best shown in Figure 3, to provide tracks for wheels or rollers 38 which are adapted to roll up and down the track members as will be described.

One set of rollers 38 is rotatably journaled on stub shafts 39, being retained thereon by threaded cap screws 40. The stub shafts 39 have flat head portions 41 which are secured by welding to plates 42. Said plates are suitably secured by welding to a bale hoisting member designated in its entirety by the reference character 43. Said member has a bottom wall 44 curved downwardly at each end and upwardly extending side walls 45. The plates 42 are secured by welding to the lower side portions of the side walls 45. A second set of rollers or wheels 38, identical with those described and journaled in a similar manner, is secured to the upper portions of the side walls 45 spaced a substantial distance from the lower rollers 38 previously described.

Referring to Figure 3, it will be noted that sleeves 46 are journaled on the stub shafts 39. Said sleeves are connected to a pair of bars 47 which, in the position illustrated in Figure 1, extend rearwardly and upwardly from the bale hoisting member. The bars 47 are pivotally connected by pins 48, as best shown in Figure 2, to a pair of lever arms 49. Said lever arms are rigidly secured to a transverse shaft 50 rotatably mounted on a bracket structure 51 secured to the upper wall of the baling chamber at the forward end thereof.

A bracket 52, as shown in Figures 1 and 2, is secured to one of the arms 49 spaced from the pivot axis of the shaft 50. An expansible hydraulic device including a piston rod 53 pivotally connected at 54 to the bracket 52 and a cylinder 55 pivotally connected at 56 to a bracket 57 mounted on the upper wall of the bale chamber, provides means for operating the arms 49 for lifting the bale hoisting member.

A second hydraulic device including a piston rod 58 pivotally connected at 59 to the power-lift arm 19 and a cylinder 60 pivotally connected at 61 to a bracket 62 mounted on the body of the tractor, provides means for utilizing power from the tractor power-lift mechanism for operating the bale hoisting device. The forward end of the cylinder 60 is connected by a hose 63 with the rear end of the cylinder 55. The rear end of the cylinder 60 is connected by a hose 64 with the forward end of the cylinder 55. It will be thus understood that by operation of the manual control lever 22 the operator may cause the lifting arm 19 to move in a counter-clockwise direction thereby forcing fluid through the hose 63 and expanding the piston and piston rod 53 in the cylinder 55 and moving the arms 49 in a clockwise direction for operating the bale hoisting device. This operation may be reversed by moving the power lift arm 19 in a clockwise direction, thereby returning the bale hoisting member to its bale receiving position as shown in Figure 1.

A pair of cables 65 are connected to ears 66 on the bracket structure 51 and to ears 67 at the upper ends of the track members 36 for maintaining the hoisting structure in position while permitting its upper pivoting movement in case it should be encountered by the wagon body 33 when irregularities are encountered in the ground surface.

It will be noted that the track members 36 have a lower substantially horizontal portion 68 and an upwardly inclined portion 69. Said track members are extended with another substantially horizontal portion 70 at their upper ends. Said extensions act, as shown by the dotted line position of the hoisting member 45, to tilt said member by engagement with the spaced rollers 38. The bale which is being transferred is then tilted to the position shown dotted lines with the result that it slides from the hoisting member into the wagon. A plurality of rearwardly directed prongs 71 are provided to engage the bale and prevent its sliding forwardly during lifting movement of the hoisting member.

The C-shaped section of the track members 36 acts to maintain the track members in parallel relation. Additional means to stabilize the upper ends of said members is provided in the form of a bail or arch 72 which is secured to the rearmost ends of said track member. Said bail is shaped to clear the bale during discharge therefrom and also during movement into discharge position.

The dotted-line positions of the arms 49 and the bars 47 are indicated in Figure 1 with the bale hoisting member in the discharge position. It is to be understood that the cylinder 55 with its piston rod 53 will also be in extended position when the bale hoisting member is in its discharge position. The cylinder 60 and its piston rod 58 will be in collapsed position when the bale is being discharged, and the power-lift arm 19 will occupy a position spaced a substantial angular distance in a counter-clockwise position from the position shown in Figure 1.

By means of a bale hoisting device as above described the operator may transfer the bales from their position adjacent the baling chamber to a position above the receiving wagon at a sufficient height to enable the piling of a large number of bales in the wagon without rearrangement. If desired, the operator may periodically re-arrange the bales in the back of the wagon to secure the best possible loading, or a man may ride in the wagon and stack the bales as they are discharged.

It is to be understood that applicants have shown and described only a preferred embodiment of their power-actuated bale-loading device for pick-up balers, and that it is the intention to cover as part of applicants' invention all modifications and forms falling within the scope of the appended claims.

What is claimed is:

1. A bale hoisting device particularly adapted for receiving bales from a pick-up baler and delivering them vertically and rearwardly to a trailed wagon, comprising in combination with the baler, a pair of laterally spaced upwardly and rearwardly extending channel members, means for mounting the channel members on the baler, a bale receiving member mounted between said channels, a pair of spaced rollers mounted on said member at each side thereof adapted to roll in said channel members as tracks, said channel members being angled downwardly at their upper ends to change the position of the bale receiving member so as to deliver the bale therefrom, a pair of operating links connected at the sides of said bale receiving member and extending rearwardly therefrom, a rock-shaft mounted above the bale chamber, said rock-shaft having a pair of arms pivotally connected to said links, and means connected to said rock-shaft for oscillating the same.

2. A bale hoisting device particularly adapted for receiving bales from a pick-up baler and delivering them vertically and rearwardly to a trailed wagon, comprising in combination with the baler, a pair of laterally spaced upwardly and rearwardly extending channel members, means for pivotally mounting the channel members on the baler on a transverse axis, a bale receiving member mounted between said channels, a pair of spaced rollers mounted on said member at each side thereof adapted to roll in said channel members as tracks, said channel members being angled downwardly at their upper ends to change the position of the bale receiving member so as to deliver the bale therefrom, a pair of operating links connected at the sides of said bale receiving member and extending rearwardly therefrom, a rock-shaft mounted above the bale chamber, said rock-shaft having a pair of arms pivotally connected to said links, means connected to said rock-shaft for oscillating the same, and adjustable and flexible tension means connecting said channel members to the bale chamber, whereby downward movement of said members may be restricted and whereby the members may pivot upwardly about their axis when force is applied thereagainst.

3. A bale hoisting device particularly adapted for receiving bales from a pick-up baler and delivering them vertically and rearwardly to a trailed wagon, said baler adapted to be connected to a tractor having a manually controllable oscillating power member thereon comprising in combination with the tractor, said oscillating power member and the baler, a pair of laterally spaced upwardly and rearwardly extending track members, means for mounting the track members on the baler, a bale receiving and lifting member movably mounted between said track members, a hydraulic cylinder connected to said bale receiving member, a hydraulic cylinder mounted on the tractor with a piston connected to the oscillating power member mounted thereon, flexible hose connecting said cylinders for transmitting pressure from one to the other, whereby the movement of said oscillating power member may be transmitted for raising and retracting the bale lifting member.

4. A bale hoisting device particularly adapted for receiving bales from a pick-up baler and delivering them vertically and rearwardly to a trailed wagon, said baler adapted to be connected to a tractor having a manually controllable oscillating power member thereon comprising in combination with the tractor, said oscillating power member and the baler, a pair of laterally spaced upwardly and rearwardly extending track members, means for mounting the track members on the baler, a bale receiving and lifting member movably mounted between said track members, said track members being angled downwardly at their upper ends to change the position of the bale receiving member so as to deliver the bale therefrom, a hydraulic cylinder connected to said bale receiving member, a hydraulic cylinder mounted on the tractor with a piston connected to the oscillating power member mounted thereon, flexible hose connecting said cylinders for transmitting pressure from one to the other, whereby the movement of said oscillating power member may be transmitted for raising and retracting the bale lifting member.

5. A bale hoisting device particularly adapted for receiving bales from a pick-up baler and delivering them vertically and rearwardly to a trailed wagon, said baler adapted to be connected to a tractor having a manually controllable oscillating power member thereon comprising in combination with the tractor and the baler, an upwardly and rearwardly extending track structure mounted on the baler, a bale receiving member slidably mounted on said structure, said structure being angled downwardly at its upper ends to change the position of the bale receiving member so as to deliver the bale therefrom, operating means connected to said bale receiving member and extending rearwardly therefrom, a rock-shaft mounted above the bale chamber, said rock-shaft having actuating means pivotally connected to said operating means, a hydraulic cylinder connected to said rock-shaft for oscillating the same, a hydraulic cylinder mounted on the tractor with a piston connected to the oscillating power member mounted thereon, and a flexible hose connecting said cylinders for transmitting pressure from one to the other for raising and retracting the bale lifting member.

6. A bale hoisting device particularly adapted for receiving bales from a pick-up baler and delivering them vertically and rearwardly to a trailed wagon, said baler adapted to be connected to a tractor having a manually controllable oscillating power member thereon comprising in combination with the tractor and the baler, a pair of laterally spaced upwardly and rearwardly extending channel members, means for mounting the channel members on the baler, a bale receiving member mounted between said channels, a pair of spaced rollers mounted on said member at each side thereof adapted to roll in said channel members as tracks, said channel members being angled downwardly at their upper ends to change the position of the bale receiving member so as to deliver the bale therefrom, a pair of operating links connected at the sides of said bale receiving member and extending rearwardly therefrom, a rock-shaft mounted above the bale chamber, said rock-shaft having a pair of arms pivotally connected to said links, a hydraulic cylinder connected to said rock-shaft for oscillating the same, a hydraulic cylinder mounted on the tractor with a piston connected to the oscillating power member mounted thereon, flexible hose connecting said cylinders for transmitting pressure from one to the other, whereby the movement of said arm may be transmitted to said rock-shaft for raising and retracting the bale lifting member.

7. A bale hoisting device particularly adapted for receiving bales from a pick-up baler and delivering them vertically and rearwardly to a trailed wagon, said baler adapted to be connected to a tractor having a manually controllable oscillating power member thereon comprising in combination with the tractor and the baler, a pair of laterally spaced upwardly and rearwardly extending channel members, means for pivotally mounting the channel members on the baler on a transverse axis, a bale receiving member mounted between said channels, a pair of spaced rollers mounted on said member at each side thereof adapted to roll in said channel members as tracks, said channel members being angled downwardly at their upper ends to change the position of the bale receiving member so as to deliver the bale therefrom, a pair of operating links connected at the sides of said bale receiving member and extending rearwardly therefrom, a rock-shaft mounted above the bale chamber, said rock-shaft having a pair of arms pivotally connected to said links, a hydraulic cylinder connected to said rock-shaft for oscillating the same, a hydraulic cylinder mounted on the tractor with a piston connected to the oscillating power member mounted thereon, flexible hose connecting said cylinders for transmitting pressure from one to the other, whereby the movement of said arm may be transmitted to said rock-shaft for raising and retracting the bale lifting member and adjustable and flexible tension means connecting said channel members to the bale chamber, whereby downward movement of said members may be restricted and whereby the members may pivot upwardly about their axis when force is applied thereagainst.

8. A bale hoisting device particularly adapted for receiving bales from a pick-up baler and delivering them vertically and rearwardly to a trailed wagon, said baler adapted to be connected to a tractor having manually controllable power take-off means thereon including means to provide fluid under pressure comprising in combination with the tractor, said power take-off means and the baler, an upwardly and rearwardly extending track structure, means for mounting the track structure adjacent the baler, a bale receiving and lifting member movably mounted along said track structure, a hydraulic cylinder connected to said bale receiving member, flexible hose connecting said cylinder and the means to provide fluid under pressure, whereby movement may be transmitted for raising and retracting the bale lifting member.

9. A bale hoisting device for a baler adapted to be connected to a tractor and in combination a manually controllable oscillating power member mounted on the tractor, an upwardly and rearwardly extending track structure secured to the baler, a bale receiving and lifting member movably mounted along said track structure, a cylinder and piston device connected between the baler and the bale receiving member, a piston and cylinder device mounted on the tractor and connected to the oscillating power member thereon, a flexible conduit connecting the cylinders of said devices, said conduit being adapted to confine a medium for transmitting force from the piston of one device to the piston of the other device whereby power from the oscillating member on the tractor may be transmitted to the bale receiving member for raising and retracting the same.

ROBERT P. MESSENGER.
RUSSEL D. ACTON.